(12) United States Patent
Karidis et al.

(10) Patent No.: US 9,753,264 B2
(45) Date of Patent: Sep. 5, 2017

(54) ASSEMBLY FOR COLLECTING LIGHT

(71) Applicants:International Business Machines Corporation, Armonk, NY (US); Lynn Karidis

(72) Inventors: John P. Karidis, Ossining, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 13/651,959

(22) Filed: Oct. 15, 2012

(65) Prior Publication Data

US 2014/0102511 A1 Apr. 17, 2014

(51) Int. Cl.

| | |
|---|---|
| *G02B 19/00* | (2006.01) |
| *H01L 31/052* | (2014.01) |
| *G02B 7/183* | (2006.01) |
| *G02B 17/00* | (2006.01) |
| *H02S 20/32* | (2014.01) |
| *H02S 20/30* | (2014.01) |
| *H02S 20/10* | (2014.01) |

(Continued)

(52) U.S. Cl.
CPC .......... *G02B 19/0042* (2013.01); *F24J 2/523* (2013.01); *F24J 2/5431* (2013.01); *G02B 7/183* (2013.01); *G02B 17/002* (2013.01); *H01L 31/052* (2013.01); *H02S 20/10* (2014.12); *H02S 20/30* (2014.12); *H02S 20/32* (2014.12); *H02S 40/36* (2014.12); *F24J 2002/5458* (2013.01); *F24J 2002/5468* (2013.01); *Y02E 10/47* (2013.01)

(58) Field of Classification Search
CPC .. G02B 7/183; G02B 19/0042; G02B 17/002; G02B 17/006; G02B 19/0019; G02B 17/004; F24J 2002/1095; F24J 2002/109; F24J 2002/1085; F24J 2002/108; F24J 2/16; F24J 2/542; H02S 20/10; H02S 20/30; H02S 20/32; H02S 40/36; H01L 31/052
USPC ........... 126/600, 603, 627, 624, 571; 52/109
See application file for complete search history.

(56) References Cited

U.S. PATENT DOCUMENTS

| | | | | |
|---|---|---|---|---|
| 1,111,239 | A | * | 9/1914 | Smelser ..................... F24J 2/16 126/607 |
| 3,558,219 | A | * | 1/1971 | Buckingham et al. ......... 59/851 |

(Continued)

FOREIGN PATENT DOCUMENTS

GB 211991 * 3/1924

*Primary Examiner* — Steven B McAllister
*Assistant Examiner* — Steven Anderson, II
(74) *Attorney, Agent, or Firm* — Fleit Gibbons Gutman Bongini Bianco PL; Jon Gibbons

(57) ABSTRACT

Disclosed is a novel solar collecting assembly that in which more than one mirror and/or photovoltaic is linked mechanically so that many mirrors share a few actuators, rather than equipping each mirror with individual actuators. One example includes a set of structures, such as poles or pipes. Each of the support structures has a first end and a second end, and each of the support structures is associated with at least one solar collecting assembly. A first set of cables is arranged to move the solar collecting assemblies in a first direction, each of the first set of cables includes a set of first alignment fittings disposed thereon. The first end of each of the solar collecting assemblies is attached to one of the first alignment fittings in the first set of cables. A second set of cables arranged to move the solar collecting assemblies in a second direction.

20 Claims, 9 Drawing Sheets

(51) Int. Cl.
*H02S 40/36* (2014.01)
*F24J 2/52* (2006.01)
*F24J 2/54* (2006.01)

(56) References Cited

U.S. PATENT DOCUMENTS

| | | | | |
|---|---|---|---|---|
| 3,872,854 A * | 3/1975 | Raser | | 126/606 |
| 3,973,834 A | 8/1976 | Penn et al. | | |
| 4,102,326 A * | 7/1978 | Sommer | | 126/575 |
| 4,172,443 A | 10/1979 | Sommer | | |
| 4,251,135 A | 2/1981 | Stone | | |
| 4,425,904 A * | 1/1984 | Butler | | 126/606 |
| 4,466,423 A | 8/1984 | Dolan et al. | | |
| 4,488,779 A * | 12/1984 | Varner | | 359/853 |
| 4,552,438 A | 11/1985 | Murphy | | |
| 4,608,964 A * | 9/1986 | Russo | | 126/688 |
| 4,832,001 A | 5/1989 | Baer | | |
| 4,968,355 A * | 11/1990 | Johnson | | F24J 2/085 |
| | | | | 126/573 |
| 5,787,878 A | 8/1998 | Ratliff, Jr. | | |
| 7,343,913 B2 | 3/2008 | Niedermeyer | | |
| 7,380,549 B1 | 6/2008 | Ratliff | | |
| 7,677,241 B2 * | 3/2010 | Hickerson | | F24J 2/16 |
| | | | | 126/571 |
| 7,878,191 B2 | 2/2011 | Bender | | |
| 8,100,122 B2 * | 1/2012 | Collins et al. | | F24J 2/405 |
| | | | | 126/601 |
| 2009/0107542 A1 * | 4/2009 | Bender | | 136/246 |
| 2009/0320900 A1 | 12/2009 | Carroll | | |
| 2010/0000516 A1 | 1/2010 | Conger | | |
| 2010/0236539 A1 * | 9/2010 | Lee | | 126/600 |
| 2010/0269428 A1 * | 10/2010 | Stancel et al. | | F24J 2/5205 |
| | | | | 52/173.3 |
| 2012/0298180 A1 * | 11/2012 | Ratti et al. | | 136/246 |

\* cited by examiner

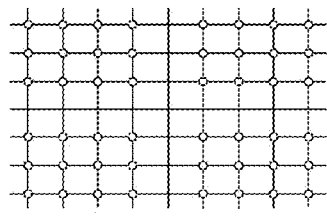
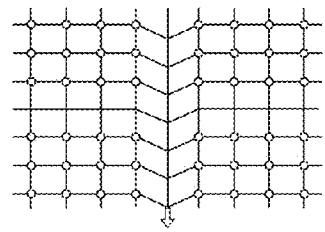
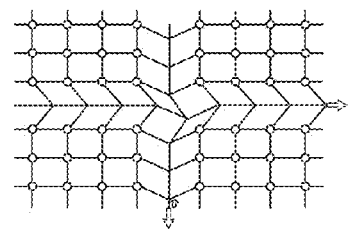
FIG. 18　　　　FIG. 19　　　　FIG. 20
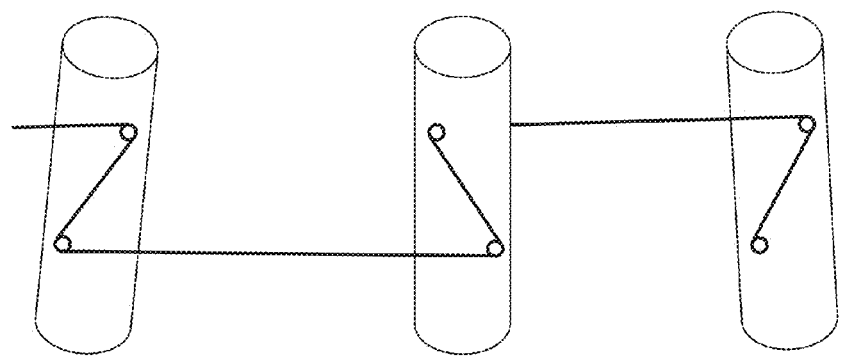
FIG. 21

ASSEMBLY FOR COLLECTING LIGHT

BACKGROUND

The present invention generally relates to a field of gathering and reflecting solar energy, and more particularly relates to the heliostat or device that includes an array of solar collectors, either a mirror or photovoltaic, which turns to track the position of the sun in the sky.

With current technologies for solar power, the cheapest mechanisms (according to the NREL Solar Advisor Model https://.nrel.gov/analysis/sam/) are concentrating fields with mirrors shining and concentrating the light on a tower. Approximately half the cost is in the mirrors, and two-thirds of the remainder in a heat powered generator and the remainder in the cost of the tower. Land near desserts with abundant sun is of negligible cost. Towers are typically 45 meters to 90 meters high and the fields can extend hundreds of meters from the tower on the sides.

Heliostats for these systems can sometimes be very large, with mirror assemblies over 10 meters square, and sometimes be quite small but much more numerous, with mirrors on the order of 1 meter square. The former systems need very large and robust tower supports and dual-axis actuators, while the latter type systems require very large numbers of actuators. Both systems, however, require a lot of "non-mirror" material and rather expensive actuators, which increases the cost of the mirror field. In one NREL report, the total cost of the mirror array is on the order of $200/m$^2$. Accordingly, a lower cost point to build solar collectors is desirable in order to compete with other energy sources.

BRIEF SUMMARY

The present invention provides a competitive cost point, in order to bring utility-scale solar thermal power generation much closer to the cost of a gas-fired plant. In one example, the cost and weight of each solar collecting assembly is reduced. More than one solar collecting assembly is linked mechanically so that many solar collecting assemblies share a few actuators, rather than equipping each solar collecting assembly with individual actuators.

An array of solar collecting assemblies is described for collecting light. In one example, the assembly includes a set of support structures, such as poles or pipes. Each of the support structures has a first end and a second end, and each of the support structures is associated with at least one solar collecting assembly, such as mirror, a photovoltaic, or both. A first set of cables is arranged to move the solar collecting assemblies in a first direction, each of the first set of cables includes a set of first alignment fittings, such as a swage connector, disposed thereon. The first end of each of the solar collecting assemblies is attached to one of the first alignment fittings in the first set of cables. A second set of cables is arranged to move the solar collecting assemblies in a second direction, each of the second set of cables includes a set of second alignment fittings disposed thereon. The second end of each of the solar collecting assemblies is attached to one of the second alignment fittings in the second set of cables.

In one example the first set of cables is arranged parallel to each other along a first direction. In another example, the first set of cables is arranged substantially radially from a center point or circumferentially around a center point. One or more of these cables may be moved by actuators to adjust the position of solar collecting assemblies relative to the position of the sun.

In one example, the alignment fittings on the first set of cables and second set of cables are placed at non-uniform distances there between. These distances are determined by the relative alignment to the sun of the support structures/poles. Non-uniform attachment points on the support structures also assist with aligning each individual support structure with the sun.

One or more perimeter cables are attached to the first set of cables, the second set of cables or both to assist with alignment. Support structure may be attached to one or more of the support poles to assist with alignment of the solar collecting assembly. Moreover, the mounting of the solar collecting assembly relative to the support pole can be made at an angle between 20 and 80 degrees to provide alignment with the sun during sunrise and sunset.

In another example, a 2-dimensional array with solar collecting assemblies, such as a mirror and/or a photovoltaic is described. The two-dimensional array of solar collecting assemblies includes a first set of cables connecting the solar collecting assemblies in a row sequence, the first set of cables contain a first alignment feature disposed thereto and attached to each solar collecting assembly in the row. A second set of cables connects the solar collecting assemblies in a column sequence, said second set of cables contain a second alignment feature disposed thereto and attached to each solar collecting assembly in the column.

A third set of cables connected to the first set of cables and the second set of cables and placed at outer perimeter of the two-dimensional array of solar collecting assemblies, the third set of cables capable of moving the first set of cables and second set of cables via actuators.

Further, both upper and lower cables may be used with each solar collecting assembly in a row and column array.

In installations where wind loads are of a concern, a base structure is used. The base structure has a hole in an apex thereof to receive the first end of the solar collecting assembly. A set of cables connecting the solar collecting assemblies, the set of cables contain a first alignment feature disposed thereto and attached to each solar collecting assembly.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIGS. 18, 19, and 20 are an illustration of pulling laterally on some adjustment cables in the array, the pitch between adjacent rows and/or columns of the solar collecting assembly can be reduced as desired;

FIG. 21 and FIG. 22 are an illustration of attaching cables at different position at the top and bottom to permit a seasonal adjustment applied between the left and middle support poles;

DETAILED DESCRIPTION

Non-Limiting Definitions

The term "actuator" is used to define an electro-mechanical device including linear and rotary winches for adjusting the position and/or tension of one or more cables.

The term "alignment" is used to define the process of adjusting a field of solar collecting assemblies to maximize their exposure to the sun. Alignment not only accounts for the positions in the sky of the sun each day, but also the position of the sun in the sky to account for seasonal changes.

The term "alignment fitting" or "swage alignment fitting" is used to define any fitting disposed on a cable at a desired position through hot or cold forging, clamping, heating or welding, at a desired position.

Figure 23:
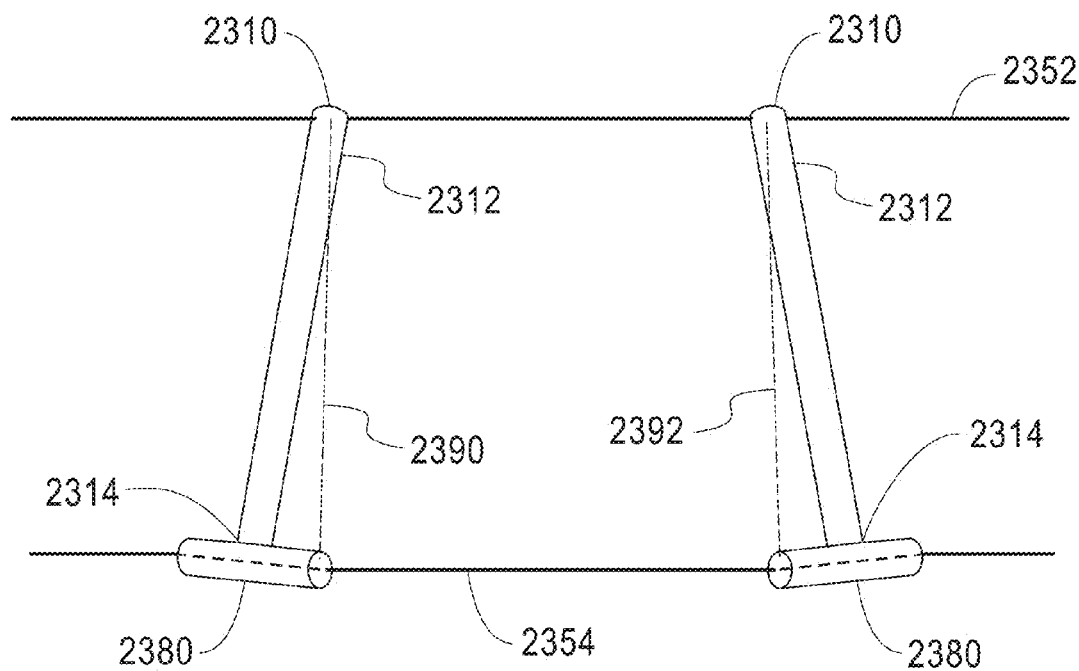
FIG. 23 is an illustration of attaching cables with the use of spacer tube.

The term "base" is used to define a bottom support for the support pole that adds weight to the solar collecting assembly, used in locations where heavy wind loads are prevalent very strong cord, typically made from multiple strands of materials including metal, plastic, composites, or a combination thereof. Item 2314 in FIG. 23 is one example of a base.

Figure 1:
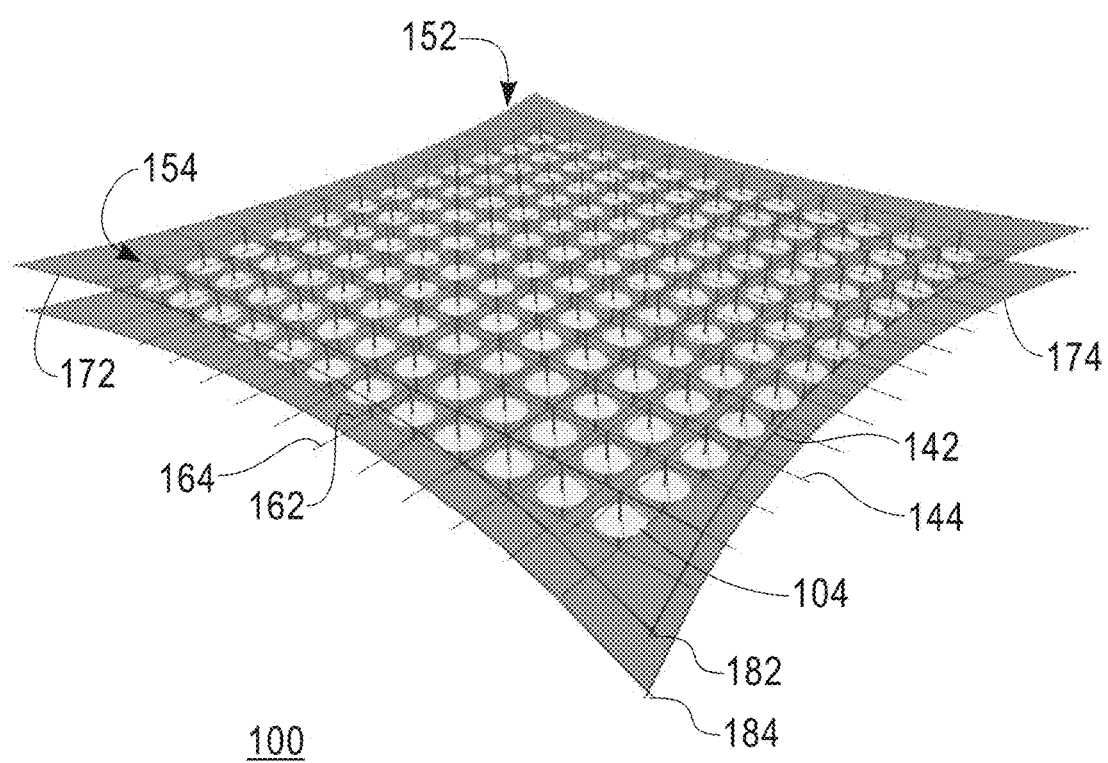
FIG. 1 is a front perspective view of a 2-dimensional array of solar collecting assemblies.

The term "cable" is used to define very strong cord, typically made from multiple strands of materials including metal, plastic, composites, or a combination thereof. Item 154 in FIG. 1 is one example of an array of cables.

Figure 2:
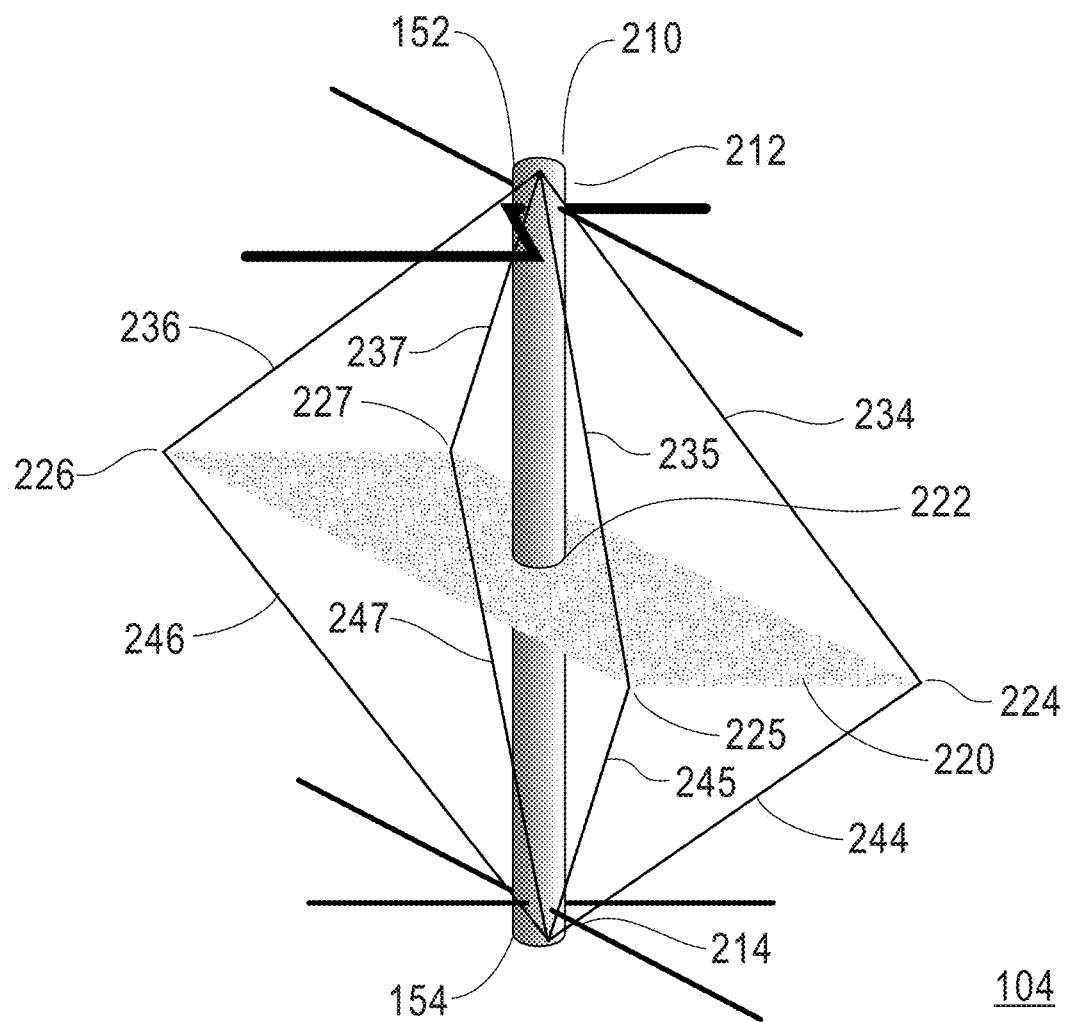
FIG. 2 is front perspective view of a solar collecting assembly of FIG. 1.

The term "solar collector" is used to define a light collecting component of the solar collecting assembly typically a mirror, photovoltaic or both. The solar collector is typically coupled to and turns with the solar collecting assembly. One or more of any types of mirror, reflective surface, and photovoltaic may be used as part of the solar collector. Item 220 in FIG. 2 is one example of a solar collector.

The term "solar collecting assembly" is used to define any structure used to collect light, typically sun light. In one example, the solar collecting assembly is a mirror or one or more mirrors fastened to a movable structure. In another example, the solar collecting assembly may include photovoltaic collectors fastened to the moveable structure in place of or along with mirrors. Item 104 in FIG. 1 is one example of a solar collecting assembly.

The term "support structure" or "support pole" or "support pipe" is used to define any moveable mechanical structure. In one example the support pole attached to one or more arrays of positioning cables and holds a solar collecting assembly. The support pole helps to stabilize the solar collecting assembly and reduces the amount of the wind load off the cable array. Item 210 in FIG. 2 is one example of a support pole.

Field Array

The present invention provides a field of solar collecting assemblies at a cost effective price point. The cost and weight of each solar collecting assembly is reduced. Further, two or more solar collecting assemblies are mechanically linked so that multiple solar collecting assemblies share actuators, rather than equipping each solar collecting assemblies with individual actuators.

Turning now to FIG. 1, is a front perspective view of a 2-dimensional array of solar collecting assemblies 100. The size of the array may be formed up to 45×145 meters in length and width. Further, in one example each solar collecting assembly 104 could be sized to 4×8 feet. Each of these solar collecting assemblies could be placed at a pitch of 3-4 meters or less. Thus, the 2-dimensional array 100 might comprise an array of 12×12=144 or even 15×20=300 of the solar collecting assemblies 104. Further, each solar collecting assembly 104 in one example could be made of one or more mirrors and/or photovoltaic panels. Each solar collecting assembly 104 in the array 100 and would be connected to one another by cables 142, 144 in the row direction and cables 162, 164 in column direction. In this example, each solar collecting assembly 104 is fastened at both the top 152 cable array and bottom cable array 154. In this example, the structure for each solar collecting assembly 104 includes a pole 104 connected to the upper cable array 152 and the bottom cable array 154.

The row cables 142, 144 and column cables 162, 164 are attached to edge cables 172, 174 which function like bridge suspension cables, but mostly lying in a plane parallel to the ground 102. The curved edge cables meet at the corners of the array 100, where the corners of the array 182, 182 in one example include wenches or other types of low-cost gear-driven cable actuators (shown below in FIGS. 16 and 17) that would pull the corners 182, 184 of the cable array to move and/or aim the array of solar collecting assemblies 102. Due to common mechanical coupling, moving any solar collecting assembly in this array 100 helps to move adjacent solar collecting arrays.

In a typical operation, the upper cable array 152 acts to position each solar collecting assembly 104 precisely. The bottom cable array 154 in one example may sit on the ground 102. The upper cable array 152 would be moved relative to the bottom cable array 154 to point each solar collecting assembly 104 in two degrees of freedom.

Solar Collecting Assembly

FIG. 2 is front perspective view of a solar collecting assembly 104 of FIG. 1. In one example a support pole or pipe 210 is attached to upper cable array 152 and to bottom cable array 154. The pole 210 is placed through solar collector 220, such as a mirror or photovoltaic. One or more guide wires are shown to keep the solar collector 220 positioned relative to the pole 210.

In one example, the solar collector 220 includes a mirror fabricated from an aluminized sheet of plastic, such as Mylar. In one example the sheet is over a frame (not shown). One example to build a frame would be to take 2" diameter PVC pipe and form a rectangle. Another example is to fabricate a frame in an injection mold. Still, another way is to stretch the film over a frame which surrounds a structural foam plate, as used in some commercially available mirrors (http://glasslessmirror.com/about/). There would be a hole cut in the center of the sheet, or a circular array of sub-mirrors can be used to form a larger mirror having an open space in the middle.

A guide pipe 210 (or injection formed piece) would go through a hole 222 in the solar collector 220 and would be perpendicular to the plane of the solar collector. The guide pipe 210, in one example is 8 feet long and is inserted so that it extends 4 feet from the solar collector 220 in both directions. In another embodiment, the solar collector 220 could be placed much closer to one end 212 of the pipe 210 than the other end 214, which could have the advantage of transmitting wind loads preferentially to one end of the pipe. From each end of the pipe 210, 212 would be upper guide wires 234, 235, 236 and 237 and lower guide 244, 245, 246 and 247 attached to the corners 224, 225, 226, and 227 of the solar collector 220.

As described above for FIG. 1, for the array 100 of solar collecting assemblies 104 there are two arrays: an upper array 152 and lower array 154 of cables. Each array 152, 154 consists of a set of cables running in the x-direction (142, 144) and the y-direction (162, 164), with each intersection of the cables in the x-direction and in the y-direction attaching to a guide pipe 210 on either the upper cable array 152 or the bottom cable array 154. Around the grid is a set of edge cables 172, 174, 176 and 178. The cables in the x-direction and the y-direction terminate and attach to the edge cable 172, 174, 176, and 178. At the point where the cables in the x-direction and in the y-direction attach to the edge cable there are connections often to adjacent array of solar collecting assemblies to keep the grid stretched out. These connections will be described later.

The bottom cable array 154 is stationary (except for thermal expansion). As the upper cable array 152 moves all the solar collecting assemblies attached to it change their angle to follow the sun.

For mirrors, at any given time of day and position of the sun in the sky, each of the solar collecting assemblies 104 in an array 100 must be pointing in a slightly different direction in order to individually reflect sunlight on a tower such as the NREL Solar Advisor Model (https://www.nrel.gov/analysis/sam/). Each solar collecting assembly 104 has an individual distant sun onto the solar receiver at the top of the tower. This individual focusing of each solar collecting assembly 104 can be achieved in one of two ways. A first method is by adjusting the angle of each solar collecting assembly 104 on its support pole if the upper and lower cables have the same spacing. A second method is by adjusting the relative spacing of the top and bottom cable arrays if all solar collecting assemblies are mounted in a fixed direction (usually parallel to) the support pole 210.

In the examples above, the cable arrays have been shown to be generally rectilinear, in another example, the cable arrays are formed in a circumferential direction with cables positioned radially from a center point. In this example the cable array resembles a spider web.

Fastening to Support Pole

In order to allow for maximum motion of the solar collecting assemblies the solar collecting assemblies can be mounted at different angles with respect to the support pole. The maximum motion must accommodate for beginning of period of the day e.g. sunrise and the ending period of the day e.g. sunset. For example, the inventors discovered that mounting solar collecting assemblies to the support pole at an angle between 20 and 80 degrees with respect to the support pole helps with alignment during sunrise and sunset. In another example, the bottom of the support poles are set at different heights, to compensate for the maximum movement needed during sunrise and sunset.

Different Cable Spacing

Figure 3:
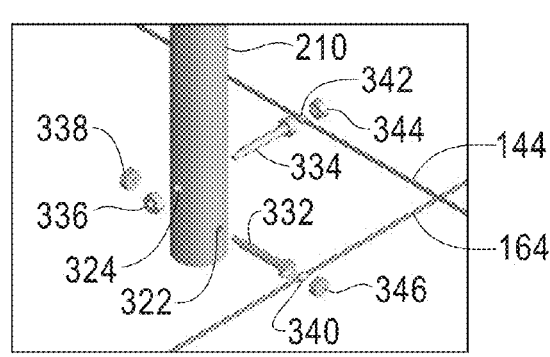
FIGS. 3 and 4 are front perspective views of alignment feature swaged onto cables of FIG. 2.
Figure 4:
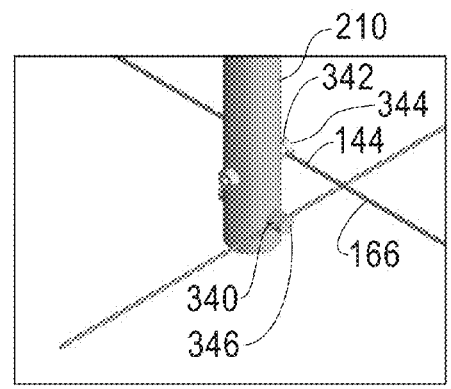

In an example, where different cable spacing is used, the direction of the solar collecting assembly 104 is unaffected by any rotation around support pole 210. One cost effective method to accurate provide any desired spacing between each of the support pole 210 connection points in the upper cable array 152 and bottom cable array 154. This swaged alignment fitting 320 is shown in FIG. 3 and FIG. 4. The new method comprises support pole attachment pins 332, 334 and associated tightening nuts 336, 338 which formed to fit through holes 322, 324 in support pole 210 through attachment that are clamped, with threaded caps 344, 346 onto threads on the head of alignment fittings 340, 342 which are swaged onto the cable 144, 164.

Figure 5:
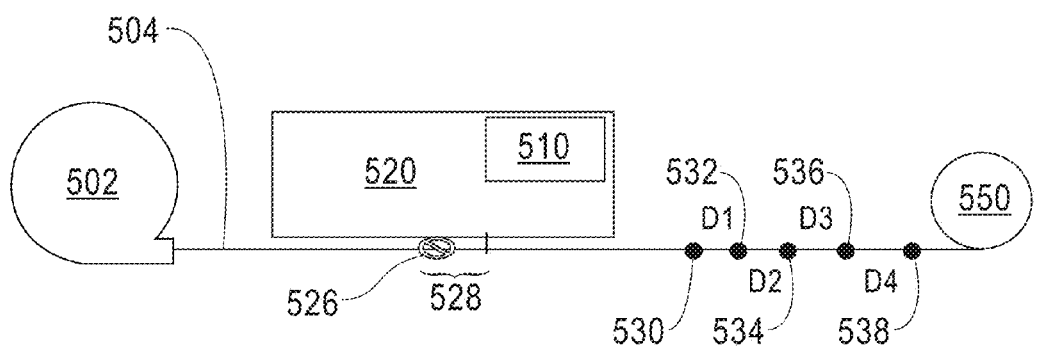
FIG. 5 is a computer controlled fixturing device.

Turning to FIG. 5, shown is a computer controlled fixturing device 520. The precise location/spacing of the swaged alignment fitting 340, 342, are determined by a computer 510 controlled fixturing device 520 in a factory, before the cables 142, 144, 162, and 164 are sent out to the field. In one example, the factory device 520 fixturing comprises an input spool of cable 502, a hydraulic swaging press 526, a flat space 528 where the cable 504 can be extended under fixed tension, and a computer-controlled positioning stage (not shown) that holds a receiving socket for the swage alignment fittings 530-538. For any given cable in the x-direction or the y-direction in a planned installation, a computer 510 defines an identifier/name for the cable (not shown) and calculates the desired cable spacing between adjacent attachment points. Shown are four example different cable spacing (D1, D2, D3, D4) between each of the swage alignment fittings. After a first alignment fitting 568 is swaged onto the identified cable 504, the cable is extended until the first alignment fitting 340, 342. The alignment fitting 340,342 is positioned at exactly the required distanced from the first ring while the cable 504 is held under a constant tension at the input spool 502. Then the second alignment fitting 536 is swaged onto the cable 504. The process is repeated for each of the remaining alignment fittings 530-534. An output spool of cable 550 with swaged alignment fittings is formed. When finished, the identified cable 504 in the output spool of cable 550 intended for a specific location in the array 100 will have alignment fitting 530-538 at any desired set of spacings. This technique can keep the position tolerance of less than 1 mm. The appropriately labeled output spool of cable 550 are installed in the desired field location, this computer-controlled swaging process produces cable arrays with precise, accurate, and predetermined mounting positions, thus addressing the need for all solar collectors/mirrors 220 in an array 100 to have slightly different starting positions.

Figure 6:
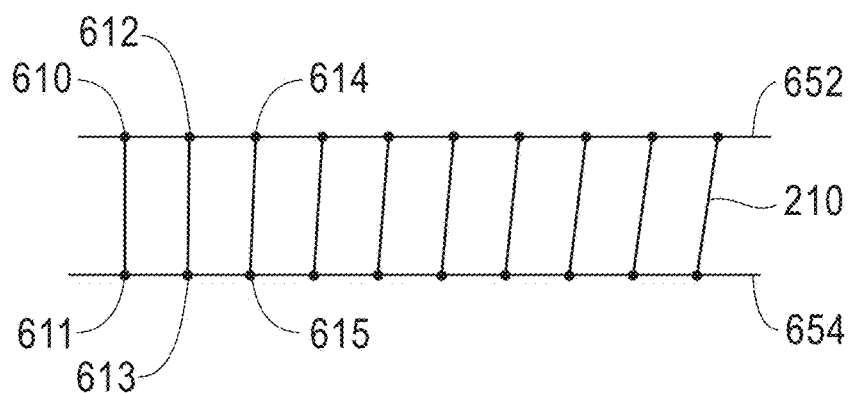
FIG. 6 is an illustration of swaged alignment features on cables that produce variable angles across an array of support poles.

FIG. 6 is an illustration of how precise control of the placement of swaged alignment features 610, 612, 614 on upper cable 652 and alignment features 611, 613, 615 on lower cable 654 can produce variable angles across an array of support poles 210. Note that the solar collectors/mirrors 220 are not shown for clarity.

Figure 7:
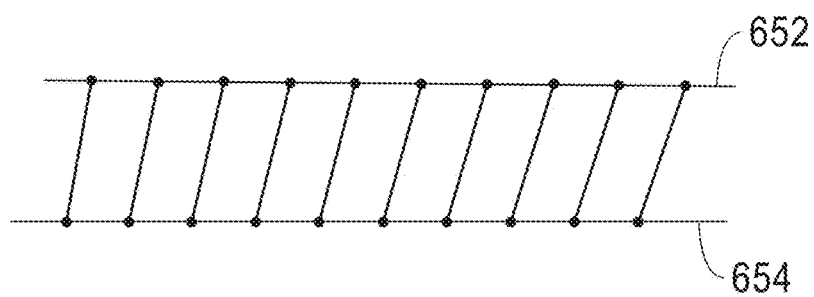
FIG. 7 is an illustration of adjusting the average angle of a group of solar collecting assemblies through a lateral shift in one of the cables in either the upper cable array or the bottom cable array or both.

FIG. 7 is an illustration of how the average angle of a group of support poles 210 can be adjusted through a lateral shift in one of the cables 652, 654 in either the upper cable array 152 or the bottom cable array 154 or both.

Figure 8:
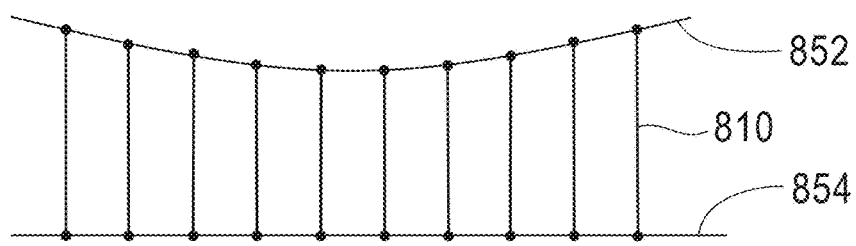
FIG. 8 is an illustration of a very slight decrease in the horizontal distance between the ends of the cable array as the vertical droop increases.
Figure 9:
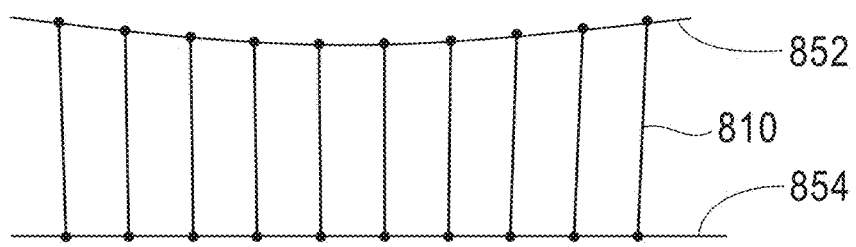
FIG. 9 is an illustration of how increasing the tension, and thus decreasing the sag, of a catenary cable suspending the top of telescoping support poles can introduce a slight but varying angle across an array of solar collecting assembly.

The support pole 210 must move by slightly different angles in order to accurately point and concentrate solar energy at a desired point, such as a tower, at different times of day and in different seasons of the year. Turning now to FIGS. 8 and 9 shown are one example to produce different angles of each solar collecting assembly 104 is by adjusting the tension (and thus the sag) in the upper cable 852, which is attached in this case to telescoping support poles 810.

In this design, telescoping poles 810t can accommodate a changing distance between upper and lower connections to the cable arrays 852, 854, and one of the cable arrays is allowed to droop slightly as shown. In one example, the bottom cable 854 in bottom cable array 154 rests on the ground or ground-based supports while the upper cable 852 in upper cable array 152 is suspended from its corners. The amount of droop in the array will increase as the tension in the cables decreases. As the vertical droop increases there is a very slight decrease in the horizontal distance between the ends of the cable array, as shown in FIG. 8. For a reasonable range of solar collector field design parameters, only very slight adjustments in the upper cable 852 in upper cable array 152 spacing to achieve good alignment. This provides proper pointing performance throughout the day and across the seasons, and variations in array tension.

FIG. 9 is an illustration of how increasing the tension, and thus decreasing the sag, of a catenary cable suspending the top of telescoping support poles 810 can introduce a slight but varying angle across an array of solar collecting assembly 104.

Figure 10:
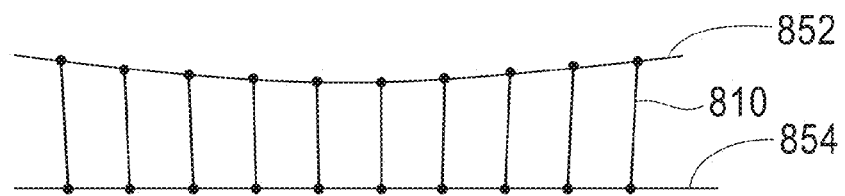
FIG. 10 and FIG. 11, are an illustration of adjusting the height of the upper cable array, where the spacing of each swage alignment fitting differs on the upper cable array and the lower cable array.
Figure 11:
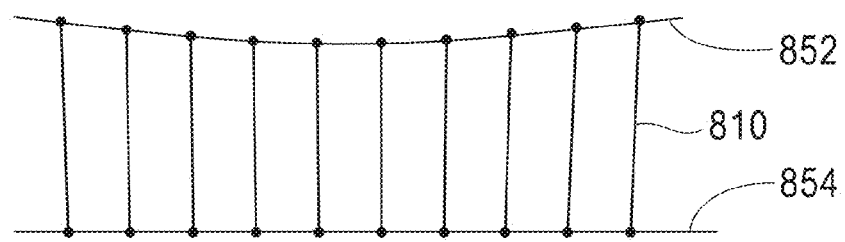

As shown in FIG. 10 and FIG. 11, by adjusting the height of the upper cable 852 in upper cable array 152, where the spacing of each swage alignment fitting 340, 342 differs on the upper cable array 152 and the lower cable array 154. Increasing the height of a catenary cable suspending the top of telescoping support poles 820 having different initial angles can introduce a slight but varying angle across an array of solar collecting assemblies 820. Moreover, by mounting one end of the support poles (generally the bottom) to the ends of a second array of poles, which can be manipulated in such a way that the tip spacing can be adjusted slightly.

Figure 12:
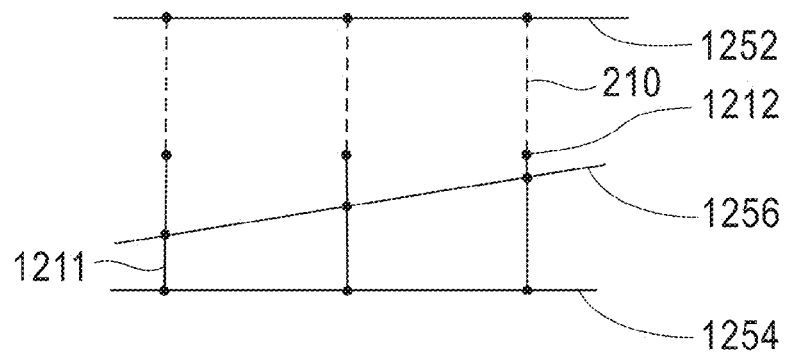
FIG. 12 and FIG. 13, are an illustration of another design using a third cable array to produce changes in the tilt angles across the array.
Figure 13:
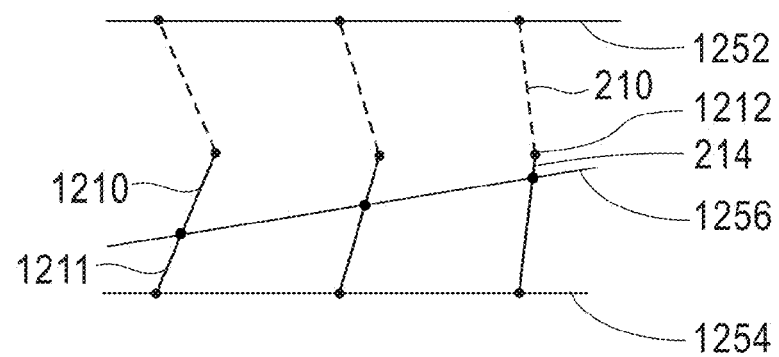

Turning to FIG. 12 and FIG. 13, shown is another design using a third cable array 1256 to produce changes in the tilt angles across the array 100 of support poles 210. As shown in FIG. 12, it is possible to use two arrays or cables to create a set of mounting points 1212 whose pitch increases or decreases as one of the arrays is moved horizontally relative to the other. When these mounting point to hold one end 1256 of the support poles 210 while the opposite ends are mounted to a fixed pitch upper cable array 1252 and lower cable array 1254, then both the average angle of all of the solar collectors can be adjusted as well as the difference in angle from one end of the array to the other.

A preferred embodiment would make use of a cable 1254 of first cable array resting on the ground and supporting the bottom 214 of a top end 1210 of "pitch-adjusting poles" 1211. These poles are held at different angles by a second cable array attached to points near the middle 1215 or the mid/upper region of the support poles 210. The tops 1212 of the pitch-adjusting poles are then attached to the bottom 214 of the support poles 210, while the tops 212 of the support poles are attached to the third cable array 1256. Assuming a fixed bottom cable 1254 of bottom array 154, it can be seen that horizontal motion of the top array alone will change the angle of all solar collectors. Moving the cable 1256 of a middle array in the same direction as the top array will have the effect of canceling out some of the average tilt, but it will also introduce a variation in the tilt angles as the pitch at the bottom of the support poles becomes different from the pitch at the top of the poles.

Figure 14:
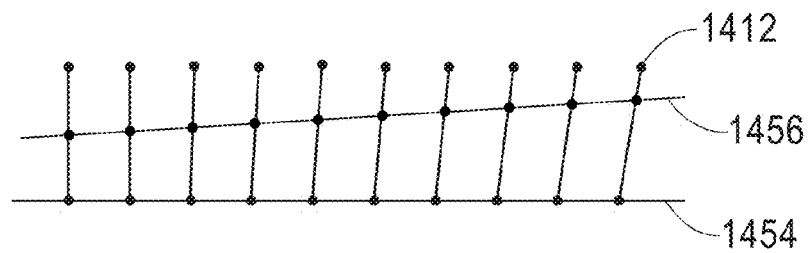
FIG. 14 and FIG. 15 are an illustration of how an array of support poles at different initial angles can produce a slightly varying spacing of upper attachment points.
Figure 15:
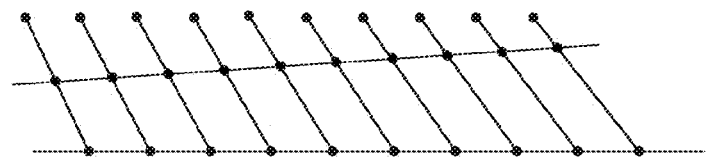

FIGS. 14 and 15 illustration of how an array of support poles at different initial angles can produce a slightly varying spacing of upper attachment points. Those skilled in the art will recognize each pair of poles connected by a cable whose length is different than the pole spacing at the ground to be a non-parallelogram four-bar linkage and as such, the angle by which the poles rotate is slightly different. This difference creates a small variation in the spacing of the upper attachment points as the cable connecting the mid-section of the poles is moved laterally.

In FIG. 15 support poles are pivotably attached to the tops of the support poles (not shown). When both the solar collector cable and the cable connecting the mid-sections of the support poles are moved laterally, the focal length of the array will change slightly as a result of the imperceptible increase in the spacing of the bottom of the support poles (shown in blue, without solar collectors).

Figure 16:
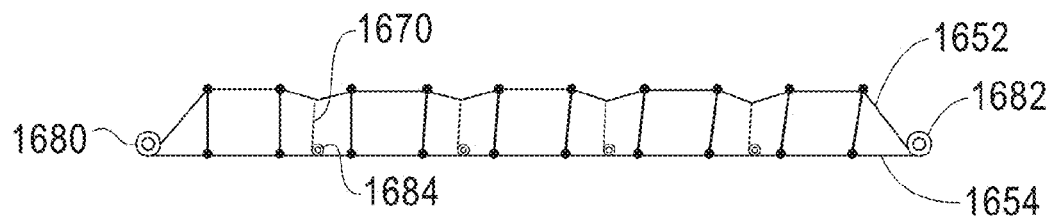
FIG. 16 and FIG. 17 are an illustration of using small winches distributed throughput the array to adjust the effective length of some or all of the cable segments connecting the tops of the support poles.
Figure 17:
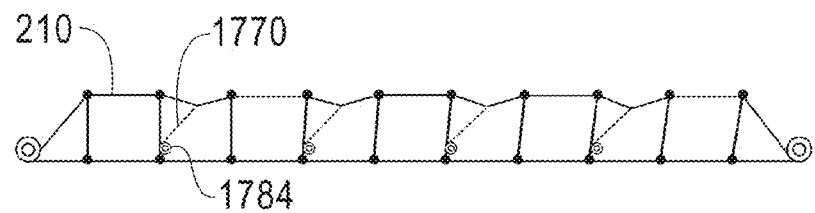

FIGS. 16 and 17 by using small winches 1684 distributed throughput the array to adjust the effective length of some or all of the cable segments 1670, 1770 connecting the tops 212 of the support poles 210. Larger wenches 1680, 1682 may be used at the ends of the cable 1652, cable 1664 or both.

In this example, some or all of the cable segments 1670, 1770 connecting the tops 212 of the support poles 210 can be pulled downward by small motors/winches 1684 attached to the ground, thus adjusting the relative angle between all the poles 210 to the left or right of the winch. Larger winches 1680, 1682 at the ends of the rows create the average tilt in the array. In one example, one of the larger winches is replaced with a spring (and optional damper) to maintain desired tension in the control cable 1652.

In FIG. 17, the small adjustment winches 1784 are attached near the bottom of selected support poles to eliminate the need for them to be weighted or otherwise held down on the ground. Also by adjusting the cable mounting location on each pole so that adjacent solar collectors rotate by different amounts.

FIGS. 18, 19, and 20 by pulling laterally on some adjustment cables in the array, the pitch between adjacent rows and/or columns of the array of solar collecting assemblies can be reduced as desired. This effect can be used to adjust the average pitch to better follow the sun. Adjustment cables can be placed every row and column, or at less frequent intervals when pointing accuracy allows.

Z-Pattern Connections

Figure 22:
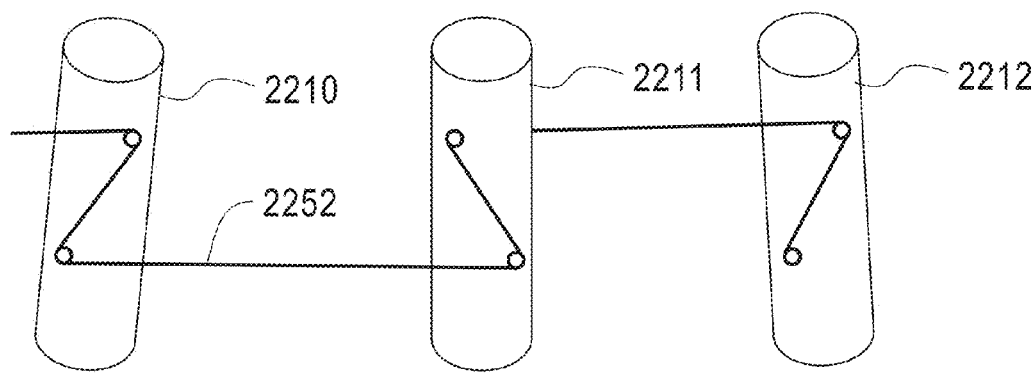

As the sun moves it is desirable to have all the solar collectors to move by changing with the same angle. This can be achieved if the cables and the support poles form a parallelogram. However, the various solar collectors in the array of solar collecting assemblies need to be at slightly different angles. If adjacent support poles 2210, 2211, 2212, as shown in FIG. 22, are not parallel, then this no longer forms a parallelogram. This can be remedied by having a spacer tube 2380 as shown in FIG. 23. In FIG. 23, the support poles 2310 are a bit closer together on the top 2312 than on the bottom 2314 so that the whole field forms the phased equivalent of a curved mirror. In one example a tube around the cables is attached on the bottom grid where the length of the tube is of a size that the cable 2352, 2354 between solar collecting assemblies outside of the tube matches the length of the cable 152 on the top grids. That tube is attached to the support pole 210 in such a way that when the support pole 210 changes angles the tube, which is rigidly attached to the support pole 210 moves through the same angles (though at 90 degrees offset). In this way a parallelogram (lines 2390 and 2392 are parallel in this example) is maintained. An alternative to the spacer tube or an additional mechanism is to have the cable at the top of the support pole go through a sort of Z-pattern, as shown in FIG. 21 and FIG. 22. Rather than the cable coming from the east attaching on the east side of the support pole, it could go through a slot and attach to the west side of the support pole. It would then come back through the support pole and bend around something on the east side of the support pole and then go through another slot to exit on the west side. That also enables parallelogram where the support poles are not parallel but their attachment points are. One variant of this which will be important for the pyramid connection scheme is to use both the spacer tube on the bottom and the Z-pattern connection at the top, which means that the middle of the support pole 210 stays at the same place.

FIG. 21 is an illustration of attaching cables at different position at the top and bottom to permit a seasonal adjustment applied between the left support pole 2110 and middle support poles 2111. Mounting the cable 2152 to the poles differently at the top and bottom, formed different angles between the poles during tilting. For example, notice the position of attachment pins 2136 and 2138 of support pole 2112 are in different locations as compared with the support pins 2132 and 2134 of support pole 2110 and support pins 2140 and 2142 of support pole 2114. The different locations of support pins 2132, 2136, 2138, 2140, 2142 permit individual adjustments for each support pole 2110, 2112, and 2114.

FIG. 22 is another example illustration of attaching cables at different position at the top and bottom to permit a seasonal adjustment applied between the left support pole 2210 and middle support pole 2212. Again as in FIG. 21, the different locations of support pins 2232, 2236, 2238, 2240, 2242 permit individual adjustments for each support pole 2210, 2212, and 2214.

Since the attachment on the left support pole 2210 is closer to the pivot point on the left most support pole 2210 than on the middle support pole 2212, a larger change in angle for the leftmost support pole 2210 will be needed to pull the cable to the middle support pole 2212 enough to make a smaller change in angle for the middle support pole 2212.

To avoid the problem of holding ends of a cable while resisting a force pulling the middle of the cable down, additional cables are used. In example additional cables placed diagonally from one corner to the opposite (or parabola or catenary to adjacent corners) and doing that for all corners. Springs to guide these additional cables may also be used and adding some springs. The springs connect one array of solar collecting assemblies to the adjacent array of solar collecting assemblies where the cables for each terminate. These additional cables enable there to be a strong force vector on at least some of the intersection points within the array of solar collecting assemblies going in the direction the actuators at the corners move the array of solar collecting assemblies. That force is transmitted along the cable that is being pulled until it reaches the edge. From the edge through the spring, the force is transmitted to the edge of the adjacent array of solar collecting assemblies where it meets another cable and pulls on that cable, which pulls many of the solar collector on that array of solar collecting assemblies that are reached before the intersection with the diagonal cable for that array of solar collecting assemblies.

The top and bottom grids are made of the same types of cables thermal expansion should not change the angles of the support poles. In one example, the long direction of the solar collector should be positioned along a direction of North-South. The sun moves East-West and having the short side of the solar collector move that way allows more angular motion.

Wind Forces

Figure 24:
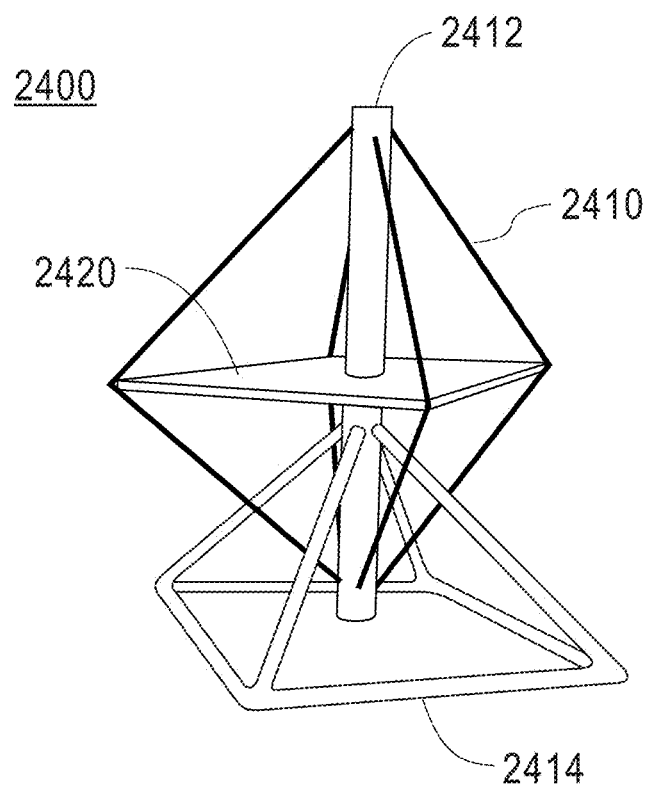
FIG. 24 is of a pipe holder for handling wind loads.

Wind forces can cause two effects: The first effect is moving the solar collecting assemblies up or down if the solar collector is angled into the wind. The second effect is putting additional force beyond their breaking strength on the cables and the solar collecting assemblies 2400. Turning to FIG. 24, a platform or base 2414 is placed below the solar collecting assembly 2400 as shown. Downward forces cause the support pole 2410 to press into the platform 2414. Although a pyramid platform is shown in this example. In another example, a cinderblock (not shown), perhaps with some soft material on the top may suffice for the platform. The upward force is handled by a cable from the platform 2414 to hold the solar collecting assembly 2400 down.

In the context of a very strong wind, the solar collecting assemblies will be rotated so that they are as flat as possible to the direction of the wind. Wind tends to move parallel to the land, and the solar collectors can be fairly parallel to the ground. If the solar collector 2420 in the center of the array of solar collecting assemblies is flat, the angle of the solar collector at the edge should be about 10 degrees.

Another alternate design adds the notion of a ground based structure that connects to the mid-point of the support pole with something like a universal joint. Potential wind forces can require strong and hence thick cables to hold against the forces of the wind on all the solar collectors held by those cables. If each mirror can be held at the midpoint of the support pole to something supported by the ground then the cables don't have the same kind of cumulative force on them, they only need to steer the solar collectors rather than keep them in place in an east-west north-south location.

One such ground structure would be a pyramid with the bottom of the pyramid buried a few inches in the ground. The pyramid could be basically a rectangle with four pipes up to the apex. The bottom of the support pole could move around inside the pyramid and the guide wires to support the mirror would go through the sides. If the pyramid's sides were at 45 degrees there is a fair amount of motion available. Pyramids to the east of the tower might be canted off to one side to enable the mirror to point more easily to the west. To secure a bit more clearance the mirror could actually be a bit higher than midpoint of the pole, without putting much additional force on the cables to resist wind forces.

There are other designs for ground supported structures involving a pole placed in a hole drilled in the ground and coming up to universal joint. Depending on the placement there may be some issues with this design with the pole avoiding the guide wires from the bottom of the mirror.

By having a ground support structure the cables can be thinner and much more flexible. That maybe essential for some of the kinds of joints described above.

In another example to correct the focus of the solar collecting assemblies is to place springs are placed into the cables. Or to let the cables droop slightly during different periods of the day. By pulling the cables then an adjustment in the distance between the tops of the support poles is made. This can change the focal length of the collection of solar collectors. That adjustment can be done over the course of a day.

Field Installation of an Array of Solar Collecting Assemblies

Spools of cable containing an upper cable array and bottom cable arrays are made by successively putting crimping tubes on the intersection points with a jig that holds the intersections to the south and east while crimping the cables onto a premade intersection holder as shown in FIG. 5.

The lower array is laid out and a support structure holder assembly is attached to each intersection point. The support structure assembly consists of two pipe collars with guide wires between them. Eventually the support structure assembly consists of a support structure holding the two collars apart and the guide wires to the solar collector are taut.

Solar collectors or mirrors are placed on the lower cable array and put into the pipe holder assembly. This leaves one pipe collar attached to the lower cable array, and the guide wires connected to the four corners of the solar collector with the remaining collar on top of the solar collector. The guide wires will have enough slack until the support pole is inserted to easily move them and attach them to the corners of the solar collector, where there will be attachment points for something which has been previously crimped onto the guide wires.

In one example the goal is make it easy for a person to reach the top of the pole to attach the collar. The upper cable array is attached to the collars. Finally, the support pole is inserted through the bottom collar, and while another holds the solar collector through the hole in the solar collector and finally through the top collar. Since the assembly is at a 45 degree angle the top collar when fully extended is approximately 6 feet tall, but the attachment of the top collar is a bit lower than that. When the pipe is fully inserted, the bottom collar is closed and the pipe locked in place.

The material costs at retail prices are: Mylar film, at roughly 25 cents a square foot or fancier material that's supposed to last longer at a bit over a dollar a foot. With example dimensions of 4×8 that would be $32. A 4 inch PVC pipe of 8 feet length for roughly a dollar a foot for the mirror pipe. Using these example dimensions this is $8. The sides of the mirror could be 1.5 inch schedule 40 pipe at roughly 50 cents a foot. Roughly 24 feet of this pipe is needed for $12. The cables on the grids need to be strong to resist wind forces and cabling that can continually handle 7000 lbs. of force can be had for $1/foot or a bit more than $12/mirror plus some space between the solar collectors. The total thus far is $64 or roughly $2/sq. foot. There are additional costs for the pipe collar assembly and the platform as well as additional costs for the actuators at the corners. $3/sq. foot would amount to roughly equal $33/meter.

The above achieves a definite pointing or focusing accuracy in pointing. For fairly small array of solar collecting assemblies, for example 25 ft. square, this should work out quite well. For larger fields where there's a desire for greater accuracy (and hence a greater heat) some additional adjustments need to be made. In an application, where the solar collecting assemblies form a concentrating fields with mirrors shining and concentrating the light on a tower, if the solar collectors are positioned directly to the East and the West of the tower when the field is on the equator, at either the vernal or autumnal equinox each mirror should have the same amount of angular motion each hour (though from a different starting place). However, if the field is placed further and further north and the sun is further "south", then the solar collectors should go through a different amount of angular motion each hour. This difference can be fairly accurately compensated for by a number of means.

One such adjustment can be achieved by attaching the cable to different points on the east and west of the support pole. Thus for example the cable could connect a few inches lower on the top and a few inches higher on the east side than the west. The effect of this is to move the pole to the east faster than the one on the west in much the same way (though a bit different than) a gear works when a cable goes around a larger and smaller wheel. That adjustment needs to be made seasonally. Every so often someone may move through one row of solar collectors and make the adjustment to that row. The changes in one row will impact all the solar collectors on one side of the change.

A simple mechanism is to have an attachment point that slides on the support pole. If one wants a single cable, the cable would go into an attachment point on the east side, travel diagonally de-pending on the season to the attachment point on the west side and then exit and go to the next pole's east side. The slider for the attachment point would probably slide to a discreet place and probably only have two places it would stay. In one place the diagonal would use up more of the cable, so a device is needed that uses up some of the cable. Then the attachment point needs the slack this can be removed.

In one example, the end points of the array of solar collecting assemblies move more rapidly than the middle so at the mid-point the attachment slider could shift from being on the east side to being on the west side.

Non-Limiting Computer Hardware and Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention, including the fixturing device 520 in FIG. 5 may include a computer (not shown). Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The fixturing device with a processor can execute the program code.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. An assembly for collecting light, comprising:
   a set of polyvinyl chloride (PVC) tubular support structures, each of the PVC tubular support structures with a first end and a second end, and each of the PVC tubular support structures being associated with but separate from at least one solar collecting assembly;
   at least one solar collecting assembly mechanically coupled to at least one of the PVC tubular support structures;
   a first set of cables arranged in a substantially perpendicular to each other in an x-direction and y-direction in a first plane substantially parallel to earth, the first set of cables forming a grid of cables in which at least one cable in the x-direction intersects with at least one cable in the y-direction at the first end of each of the PVC tubular support structures thereby permitting the PVC tubular support structures to move in a first direction, each of the first set of cables includes a first set of swage alignment fittings, each of the swage alignment fittings in the first set securely hydraulically fastened with a hydraulic press at a predetermined position along the first set of cables, and the first end of each of the PVC tubular support structures attached to one of the swage alignment fittings in the first set of cables;
   a set of a plurality of winches;
   a set of cable segments each with a first end coupled to one of the winches in the set of the plurality of winches and a second end of the cable segments coupled to one of the first set of cables, whereby exerting a pulling force on one of the set of cable segments by one of the set of the plurality of winches changes a pitch between adjacent cables in the first set of cables in the x-direction, the y-direction, or both; and
   a second set of cables arranged in a substantially perpendicular to each other in an x-direction and y-direction in a second plane substantially parallel to earth, the first set of cables forming a grid of cables in which at least one cable in the x-direction intersects with at least one cable in the y-direction at the second end of each of the PVC tubular support structures thereby permitting the PVC tubular support structures to move in a second direction, each of the second set of cables includes a second set of swage alignment fittings, each of the swage alignment fittings in the second set securely hydraulically fastened with a hydraulic press at a predetermined position along the second set of cables, and the second end of each of the PVC tubular support structures attached to one of the second alignment fittings in the second set of cables, and the first set of cables and the second set of cables are independently moveable.

2. The assembly of claim 1, wherein the set of PVC tubular support structures includes one or more support poles.

3. The assembly of claim 1, wherein the set of first swage alignment fittings disposed thereon on a cable in the first set of cables are disposed at non-uniform distances therebetween.

4. The assembly of claim 1, wherein the at least one solar collecting assembly is one of a mirror and a photovoltaic.

5. The assembly of claim 1, further comprising:
   a first actuator for moving at least one cable in the first set of cables along the first direction.

6. The assembly of claim 1, further comprising:
   a second actuator for moving at least one cable in the first set of cables along the second direction.

7. The assembly of claim 1, wherein the first end of each of the PVC tubular support structures attached to a cable in the first set of swage alignment fittings securely fastened to the first set of cables includes being attached between a threaded cap and a head of a first attachment pin in a first set of attachment pins to provide a position tolerance of the swage alignment fittings on the first set of cables of less than 1 mm.

8. The assembly of claim 7, wherein the second end of each of the PVC tubular support structures attached to a cable in the second set of swage alignment fittings securely fastened to the second set of cables includes being attached between a threaded cap and a head of a second attachment pin in a second set of attachment pins.

9. The assembly of claim 1, further comprising:
   a first perimeter cable coupled in proximity to a first end of each cable in the first set of cables.

10. The assembly of claim 7, further comprising:
    a second perimeter cable coupled in proximity to a second end of each cable in the first set of cables.

11. The assembly of claim 10, further comprising:
    a third perimeter cable coupled in proximity to a first end of each cable in a first end of the second set of cables.

12. The assembly of claim 11, further comprising:
    a fourth perimeter cable coupled in proximity to a second end of the second set of cables.

13. The assembly of claim 1, further comprising:
    a plurality of solar collecting assembly, with each of the solar collecting assemblies having an opening therethrough, and at least one of the PVC tubular support structures passing through the opening and the solar collecting assemblies mechanically coupled to the PVC tubular support structures.

14. The assembly of claim 1, further comprising:
    a set of support structures with a first end and a second end, the second end of each of the support structures pivotably attached to the first end of each of the PVC tubular support structures; and
    a third set of cables arranged parallel along a first direction to the first set of cables, and the first end of each of the support structures attached to a cable in the third set of cables.

15. The assembly of claim 1, wherein the first set of cables arranged along generally radial direction from a given center point, and wherein the second set of cables arranged in a circumferential direction around the center point.

16. The assembly of claim 1, further comprising:
at least one solar collecting assembly mechanically coupled to at least one of the PVC tubular support structures at an angle between 20 and 80 degrees with respect to at least one of the solar collecting assemblies.

17. An assembly for collecting light, comprising:
a two-dimensional array of solar collecting assemblies each connected to a polyvinyl chloride (PVC) tubular support structure with a top end and a bottom end;
a first set of cables connecting the solar collecting assemblies in a row sequence, the first set of cables contain a first set of swage alignment features, each of the swage alignment features in the first set securely hydraulically fastened with a hydraulic press fastened at a predetermined position along the first set of cables and attached to each of the PVC tubular support structure of each solar collecting assembly in the row;
a set of a plurality of winches;
a set of cable segments each with a first end coupled to one of the winches in the set of the plurality of winches and a second end of the cable segments coupled to one of the first set of cables, whereby exerting a pulling force on one of the set of cable segments by one of the set of the plurality of winches changes a pitch between adjacent cables in the first set of cables in the x-direction, the y-direction, or both;
a second set of cables connecting the solar collecting assemblies in a column sequence, the second set of cables contain a second set of swage alignment features, each of the swage alignment features in the second set securely hydraulically fastened with a hydraulic press at a predetermined position along the second set of cables and attached to each of the PVC tubular support structure of each solar collecting assembly in the column, and the first set of cables and the second set of cables are independently moveable, wherein at each intersection in which the first set of cables and the second set of cables cross, the top end of each solar collecting assembly is attached thereto;
a third set of cables connecting the solar collecting assemblies in a row sequence, the third set of cables contain a third set of swage alignment features, each of the swage alignment features in the third set securely hydraulically fastened with a hydraulic press fastened at a predetermined position along the third set of cables and attached to each of the PVC tubular support structure of each solar collecting assembly in the row; and
a fourth set of cables connecting the solar collecting assemblies in a column sequence, the fourth set of cables contain a second set of swage alignment features, each of the swage alignment features in the fourth set securely hydraulically fastened with a hydraulic press at a predetermined position along the second set of cables and attached to each of the PVC tubular support structure of each solar collecting assembly in the column, and the third set of cables and the fourth set of cables are independently moveable, wherein at each intersection in which the third set of cables and the fourth set of cables cross, the bottom end of each solar collecting assembly is attached thereto.

18. The assembly of claim 17, wherein the solar collecting assemblies are one of a mirror and a photovoltaic.

19. An assembly for collecting light, comprising:
a two-dimensional array of solar collecting assemblies formed from an aluminized sheet of plastic held by a polyvinyl chloride (PVC) frame, each solar collecting assembly including a PVV tubular support structure with a first end and a second end and the PVC tubular support structure separate from the solar collecting assemblies and attached to the PVC frame;
a pyramid shaped base structure having a hole in an apex thereof to receive the first end of the PVC tubular support structure;
a set of x-y cables arranged in a substantially x-direction and y-direction in a plane substantially parallel to earth connecting the second end of the-support structure, the set of cables contain a set of swage alignment fittings, each of the swage alignment fittings securely hydraulically fastened with a hydraulic press at a predetermined position along the set of cables and attached to each of the PVC tubular support structure of each solar collecting assembly
a set of a plurality of winches; and
a set of cable segments each with a first end coupled to one of the winches in the set of the plurality of winches and a second end of the cable segments coupled to one of the set of x-y cables, whereby exerting a pulling force on one of the set of cable segments by one of the set of the plurality of winches changes a pitch between adjacent cables in the x-y set of cables in the x-direction, the y-direction, or both.

20. The assembly of claim 19, wherein the solar collecting assemblies are one of a mirror and a photovoltaic.

* * * * *